wall et al.

(12) United States Patent
Wall et al.

(10) Patent No.: US 7,062,771 B2
(45) Date of Patent: *Jun. 13, 2006

(54) METHOD AND APPARATUS FOR GENERATING A DECENTRALIZED MODEL ON A COMPUTER NETWORK

(75) Inventors: Matthew B. Wall, Cambridge, MA (US); Timothy R. Wall, Cambridge, MA (US)

(73) Assignee: Oculus Technologies Corporation, Boston, MA (US)

( * ) Notice: Subject to any disclaimer, the term of this patent is extended or adjusted under 35 U.S.C. 154(b) by 665 days.

This patent is subject to a terminal disclaimer.

(21) Appl. No.: 09/898,501

(22) Filed: Jul. 3, 2001

(65) Prior Publication Data

US 2002/0065645 A1 May 30, 2002

Related U.S. Application Data

(60) Provisional application No. 60/215,917, filed on Jul. 3, 2000, provisional application No. 60/215,903, filed on Jul. 3, 2000.

(51) Int. Cl.
*G06F 9/00* (2006.01)

(52) U.S. Cl. .............. 719/316; 707/103 R; 707/103 Y; 707/103 X; 707/103 Z

(58) Field of Classification Search ................ 719/316, 719/318; 707/103 R, 103 Y, 103 X, 103 Z
See application file for complete search history.

(56) References Cited

U.S. PATENT DOCUMENTS

| | | | |
|---|---|---|---|
| 5,317,729 A | 5/1994 | Mukherjee et al. | 395/600 |
| 5,517,655 A | 5/1996 | Collins et al. | 395/800 |
| 5,550,976 A | 8/1996 | Henderson et al. | 395/200.06 |

(Continued)

FOREIGN PATENT DOCUMENTS

WO      WO 98/15908        8/1997

OTHER PUBLICATIONS

Borland, N. et al., "Integrating Environmental Impact Assessment into Product Design," *Proceedings of DETC98, 1988 ASME Design Engineering Technical Conference*, Sep. 13-16, 1998, Atlanta, Georgia (8 pp.).

(Continued)

*Primary Examiner*—W. Thomson
*Assistant Examiner*—Andy Ho
(74) *Attorney, Agent, or Firm*—Hamilton, Brook, Smith & Reynolds, P.C.

(57) ABSTRACT

Generation of a decentralized model on a computer network comprises generating data objects and/or function objects, publishing references to the data objects and/or the function objects and subscribing to the data objects and/or the functions by creating relationships between the data objects and/or the function objects through referencing data objects within the function objects, thereby linking the data objects and/or the function objects, wherein networks of linked data objects and/or function objects emerge. The decentralized linked data objects and/or function objects are make available for further linking with other data objects and/or function objects and messages are sent to referencing data objects and/or function objects when referenced data objects and/or referenced function objects change. The functions are solved when the messages are received, thereby causing at least one of the referenced data to be changed. The data objects and/or the function objects are stored in a distributed manner across multiple computing devices on a computer network. The relationships between the data objects and/or function objects are created without using a single coordinating computing device, or are created using multiple coordinating computing devices on the computer network.

15 Claims, 13 Drawing Sheets

U.S. PATENT DOCUMENTS

| | | | |
|---|---|---|---|
| 5,724,575 | A | 3/1998 | Hoover et al. ............... 395/610 |
| 5,787,080 | A | 7/1998 | Hulyalkar et al. |
| 5,796,986 | A | 8/1998 | Fuller .......................... 395/500 |
| 5,838,973 | A | 11/1998 | Carpenter-Smith et al. |
| 5,881,268 | A | 3/1999 | McDonald et al. |
| 5,930,512 | A | 7/1999 | Boden et al. |
| 6,349,342 | B1 * | 2/2002 | Menges et al. ............. 719/316 |
| 6,629,128 | B1 * | 9/2003 | Glass .......................... 709/203 |
| 6,898,791 | B1 | 5/2005 | Chandy et al. |
| 2003/0046047 | A1 | 3/2003 | Dong et al. |

OTHER PUBLICATIONS

Pahng, F. et al., "Modeling and Evaluation of Product Design Problems in a Distributed Design Environment," *Proceedings of DETC '97: 1997 ASME Design Engineering Technical Conferences*, Sep. 14-17, 1997, Sacramento, California (11 pp.).

Abrahamson, S. et al., Integrated Engineering, Geometric, and Customer Modeling: LCD Projector Design Case Study, *Proceedings of DETC 99: 1999 ASME Design Engineering Technical Conferences*, Sep. 12-16, 1999, Las Vegas, Nevada (9 pp.).

"PTC—Windchill Product Information Homepage," http://www.ptc.com/products/windchill/index.htm, downloaded May 24, 2000.

"Project JXTA: Technical Specification, Version 1.0," Sun Microsystems, Inc., Apr. 25, 2001 (26 pp.).

Gong, L., "Project JXTA:A Technology Overview," Sun Microsystems, Inc., Apr. 25, 2001 (12 pp.).

Abrahamson, S. et al., "Integrated Design in a Service Marketplace," *Computer-Aided Design*, 32(2) :97-107 (2000).

Senin, N. et al., "Distributed modeling and optimization of mixed variable design problems," *MIT CADlab Technical Report*: 99.01, Jan. 1999, (32 pp.).

Dabke, P. et al., "NetBuilder: an environment for integrating tools and people," *Computer-Aided Design*, 30:6 (465-472), 1998.

Dabke, P., "Enterprise Integration via Corba-Based Information Agents," *Internet Computing*, Sep.-Oct. 1999, p. 49-57.

"Enterprise Engineering Solutions—Next Generation Design Environment for the Integrated Enterprise," (white paper) *Phoenix Integration*, Nov. 1998 (12 pp.).

"iSight v.5.0 Solutions," http://www.engineous.com/isight.html. downloaded Mar. 23, 2000.

Dabke, P., "Simulation Based Design: An infrastructure for collaborative development of complex engineering products," Advanced Technology Center Working Paper, Lockheed Martin Advanced Technology Center, Feb. 5, 1999 (20 pp.).

Fisher, M., "Zero-latency Engineering™", Aviatis Corporation, 1999 (16 pp.).

Wallace, D.R. et al., "Design Process Elicitation through the Evaluation of Integrated Model Structures," *Proceedings of DETC 99, 1999 ASME Engineering Technical Conferences*, Sep. 12-16, 1999, Las Vegas, Nevada (8 pp.).

Senin, N. et al., "A framework for mixed parametric and catalog-based design problem modeling and optimization," *MIT CADlab Technical Report:* 97.02, Feb. 1997, (39 pp.).

Haupt, T. et al., "WebFlow: a framework for web based metacomputing," in *Future Generations Computer Systems*, vol. 16, No. 5, (pp. 445-451), Elsevier Science Publishers, Amsterdam, (Mar. 2000).

Pahng, F. et al., "Distribution modeling and evaluation of product design problems," *Computer Aided Design*, vol. 30, No. 6 (pp. 411-423), Elsevier Publishers BV, Barking GB (May 1, 1998).

Elmaghraby, et al., "Web-based performance visualization of distributed discrete event simulation", 12999, Proceedings of the 31$^{st}$ conference on Winter simulation: Simulation—a bridge to the future- vol. 2, ISBN:0-7803-5780-9, pp. 1618-1623.

C. Bajaj, S. Cutchin, "Web based collaborative visualization of distributed and parallel simulation", Oct. 1999, Proceedings of the 1999 IEEE symposium on Parallel visualization and graphics, ISBN:1-58113-237-9, pp. 47-54.

I. Nakahori, "Management for emergent properties in the research and development process", Aug. 15, 2000, Proceedings of the 2000 IEEE Engineering Management Society, pp.:491-496.

Marcus Goncalves, "Firewalls Complete", 1997, McGraw-Hill, ISBN 0-07-024645-9, Chapter 7.

Rao, Chernyakhovsky, and Wilsey, "WESE: A Web-Based Environment for Systems Engineering", 2000, Proceedings of the 2000 International Conference on Web-based Modeling and Simulation (WEBSIM-2000).

\* cited by examiner

METHOD AND APPARATUS FOR GENERATING A DECENTRALIZED MODEL ON A COMPUTER NETWORK

RELATED APPLICATION(S)

This application claims the benefit of U.S. Provisional Application No. 60/215,917 and U.S. Provisional Application No. 60/215,903, both filed on Jul. 3, 2000. The entire teachings of the above application(s) are incorporated herein by reference. This application is related to United States Patent Applications titled: METHOD AND APPARATUS FOR GENERATING AN EMERGENT MODEL ON A COMPUTER NETWORK (Application No. 09/898/507); METHOD AND APPARATUS FOR PROVIDING A SEARCH ENGINE FOR OPTIMIZING A DECENTRALIZED OR EMERGENT MODEL ON A COMPUTER NETWORK by Matthew B. Wall and Timothy R. Wall (Application No. 09/898,506); and METHOD FOR MAPPING BUSINESS PROCESSES USING AN EMERGENT MODEL ON A COMPUTER NETWORK by Matthew B. Wall and Timothy R. Wall (Application No. 09/898,527), these related applications filed on even date herewith and commonly owned by the owner of this application. This application is also related to United States Patent Application titled: METHOD AND APPARATUS FOR PROVIDING ACCESS CONTROL FOR A DECENTRALIZED OR EMERGENT MODEL ON A COMPUTER NETWORK by Matthew B. Wall and Timothy R. Wall (Application No. 10/040,161) filed on October 22, 2001, which claims foreign priority benefits under 35 U.S.C. 119(a)–(d) to International Application PCT/US01/21171 filed on even date herewith and commonly owned by the owner of this application.

BACKGROUND OF THE INVENTION

This invention relates generally to computer based methods of modeling processes, and more specifically to a method and apparatus for generating a decentralized model on a computer network.

Modeling is a process of describing the behavior of a system, possibly through the use of computers, such that the system's behavior can be predicted based upon varying inputs. Models can describe objects (entities) and their inter-relationships using mathematical equations. For example, a spreadsheet tool can be used to build a financial model of a particular business (system) to predict financial behavior, thus allowing a user to evaluate and choose among various solutions (designs).

Certain models are constructed from a set of modules (objects) that present an input and output interface. The inputs and outputs form connections and dependencies to use in integrating the objects to construct the model. Individual objects, although integrated, may be stored in a distributed fashion over a computer network. Objects themselves maybe comprised of multiple objects.

Different types of objects are used to relate information concerning different aspects of the system being modeled. Physical/mechanical modeling can produce solid models, surface models, three-dimensional models, two-dimensional models, and wire-frame models, and can be used to convey the physical aspects of a system within a defined space. Design modeling can be built to predict a system's behavior for a given set of design variables. Design models allow for the modification of their input variables to achieve a desired performance characteristic. Evaluation models can compare performance characteristics of a design model against specific value structures to access design alternatives.

The product design process is an example of a process that can include physical modeling, design modeling and evaluation modeling. Some people refer to these models in product design as Simulation Based Design. Product design is a complex and collaborative process that is often multi-disciplinary and multi-objective. These aspects of the product design process require a robust modeling framework.

An example of Simulation Based Design ("SBD") is a program sponsored by the Defense Advanced Research Project Agency ("DARPA") in cooperation with Lockheed Martin Missiles & Space company. The goal of SBD software is to enable an enterprise to perform "faster, better, cheaper" by establishing flexible, efficient communications channels among human participants and software tools across heterogenous resources. This work is directed to developing a collaborative distributed computing infrastructure. Their work can be used as a framework for providing interoperability for a range of software (e.g., design/modeling) tools based on a Common Object Request Broker Architecture ("CORBA") backplane. The NetBuilder application from Lockheed Martin Missiles & Space company is a framework for integrating and linking design and modeling components. An object-oriented repository for storing model components and a dynamic object server for maintaining various aspects of product development and interactions between multiple development disciplines. Legacy components within the NetBuilder framework are "wrapped" to encapsulate their capabilities, allowing legacy components to be linked with non-legacy components within the framework. Agents are also used within the NetBuilder framework to encapsulate information management paradigms, publish/subscribe information and manage automation of distributed workflow processes. NetBuilder acts as middleware to coordinate the development process.

MIT-DOME (Distributed Object-based Modeling and Evaluation) is a distributed modeling environment for integrated modeling that is used at the MIT CADLab (Senin, 1997; Pahng, 1998). In this environment, designers can easily build object-oriented models visualized as entity-relationship graphs. Both discrete and continuous variable types are allowed in the models. Models can be arranged into sub-models, these sub-models can be referenced in so called "catalogs" that allow for the selection of different sub-models when constructing a model. In MIT-DOME, model inputs with uncertain values can be defined as probability density functions, and these uncertainties are automatically propagated through the model using Monte Carlo simulation and other methods. MIT-DOME users also set goals or specifications and are provided with a design alternative which can be calculated. A built-in optimization tool, using a genetic algorithm as a solver, manipulates independent parameters and catalog choices to find an optimal tradeoff between model goals.

SUMMARY OF THE INVENTION

Existing modeling, frameworks (e.g., MIT's DOME) do provide some physical modeling, design modeling and evaluation modeling within a distributed and integrated framework, but these frameworks lack the ability to generate decentralized models created without using a single coordinating computing device, or are created using multiple coordinating computing devices on the computer network.

A decentralized model according to the present invention is created absent a coordinating computing device model and is created without a predefined or global definition, such that the decentralized model arises from a dynamic, integrated model built on a distributed, multi-computing device network. A model is comprised of data objects (modules) and/or function objects (modules) that are linked and distributed across multiple computing devices on a computer network.

The present invention provides the capability to publish model data and integrate that data to predict system performance. The decentralized model is then evaluated and optimized. The present invention can be viewed as a Web Server for engineering, product and business data. No other company currently provides customers a means to create live data links across the Internet in a software neutral environment for the purpose of creating a decentralized model. The Web-enabled, realtime business-to-business interfaces of the present invention reduce the time/cost to market for product development, as well as increase abilities to manage the product supply chain.

Accordingly, the present invention provides a method and apparatus for generating a decentralized model on a computer network. In one embodiment of the present invention a method for generating a decentralized model on a computer network comprises generating data objects and/or function objects, publishing references to the data objects and/or the function objects and subscribing to the data objects and/or the functions by creating relationships between the data objects and/or the function objects through referencing data objects within the function objects, thereby linking the data objects and/or the function objects, wherein networks of linked data objects and/or function objects emerge. The decentralized linked data objects and/or function objects are make available for further linking with other data objects and/or function objects and messages are sent to referencing data objects and/or function objects when referenced data objects and/or referenced function objects change. The functions are solved when the messages are received, thereby causing at least one of the referenced data to be changed. The data objects and/or the function objects are stored in a distributed manner across multiple computing devices on a computer network. The relationships between the data objects and/or function objects are created without using a single coordinating computing device, or are created using multiple coordinating computing devices on the computer network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9b illustrates an example model defined using the object-oriented design defined in FIG. 9a.

DETAILED DESCRIPTION OF THE INVENTION

Figure 1:
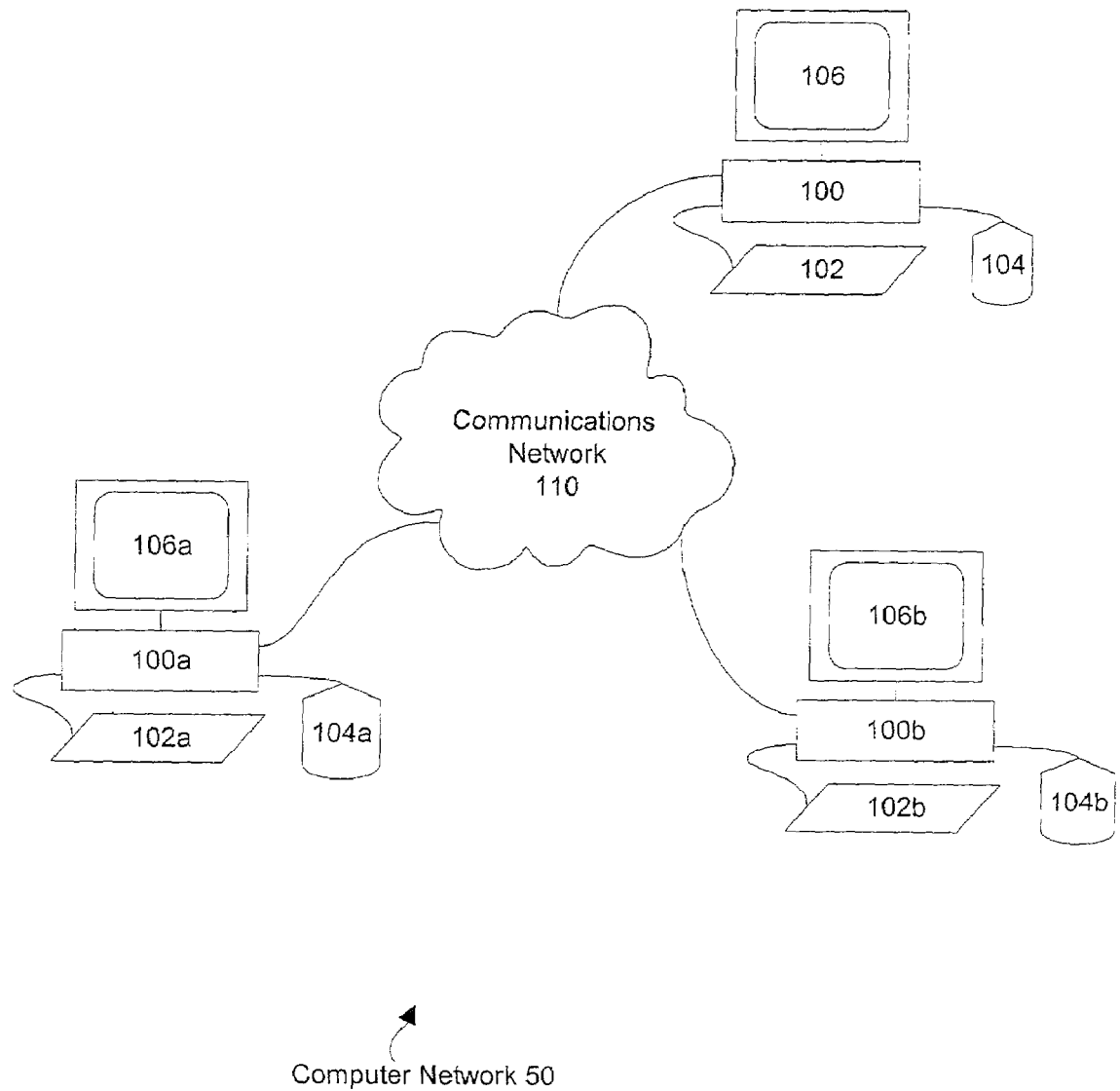
FIG. 1 illustrates a computer network on which an embodiment of the present invention is implemented.

A description of preferred embodiments of the invention follows. Various subsets of the above described distributed combinations exist in the prior art. Many systems provide non-distributed storage, execution and access (fully-centralized). MIT-DOME provides distributed storage with non-distributed execution and access. Other systems (e.g., ModelCenter™ by Phoenix Integration of Blacksburg, Va.) provide various combinations of distributed execution, storage or access, but only the present invention combines fully--distributed execution, storage and access to generate emergent models.

In a system generating an emergent model it is often desirable to represent aspects of the system using an object-oriented paradigm, in which a system is viewed as a collection of discrete objects that are self-contained collections of data structures and routines having the ability to interact with other objects in the system. Object-oriented systems provide for the definition of classes that are used to create (instantiate) objects of that class. The objects allow for the encapsulation of data and provide well defined interfaces for other objects to use when sending data to, or receiving data from, an object. One class definition can inherit the capabilities of another, allowing more complex classes to be built from simpler, underlying classes. These classes can also specify certain behaviors that are only fully defined at run-time. The combination of features provided in object-oriented systems help create a platform for hosting an embodiment of the present invention used to generate emergent models.

In the present invention, models are collections of computer instructions and data that present an interface for describing the behavior of part of a system being modeled, such that the interface is understood by other parts of the system. The present invention provides for generating an emergent model consisting of one or more models where a model consists of one or more objects, therefore a model can contain a complex hierarchy of submodels. Objects can be model inputs and outputs that are made available to relate various models to one another. These objects are implemented using standard distributed object management techniques (e.g., CORBA, DCOM). As such, each object has a corresponding object reference.

CORBA stands for Common Object Request Broker Architecture. A specification developed by the Object Management Group in 1992 in which pieces of programs (objects) communicate with other objects in other programs, even if the two programs are written in different programming languages and are running on different computing platforms. A program makes its request for objects through an object request broker (ORB), and thus does not need to know the structure of the program from where the object comes. DCOM is an acronym for Distributed Component Object Model, the version of Microsoft's Component Object Model (COM) specification that stipulates how components communicate over Windows-based networks. DCOM permits the distribution of different components for a single application across two or more networked computers, running an application distributed across a network so that the distribution of components is not apparent to the user, and remotely displaying an application.

In the present invention, the object reference can consist of a relative Uniform Resource Identifier (URL) component and/or a unique Uniform Resource Identifier (URI) component. Distributed object management techniques provide for the resolution of an object reference into a proxy object suitable for making method invocations on the corresponding remote object. Techniques for sending messages between objects in a distributed object system are common. The present invention sends and receives change messages that contain the object reference of the source of the message as well as information indicating how the source object changed. Common to message sending techniques is the option of having the sending object block or not block while the receiving object processes the message. In the present invention, blocking message processing is used.

In the present invention, objects have two primary types, that of data objects and function objects. Objects can have objects and/or object references as attributes allowing objects to be used to organize other objects. Objects can have attributes that are of numeric (e.g., floating point, integer and imaginary), string, boolean, vector, matrix, table and file type. Numeric attributes can be deterministic or probabilistic. Interdependencies or relationships within a model can be defined using function objects. Interfaces to existing information or systems can be defined using a combination of data objects and function objects.

In the present invention, objects can have constraints that are used to define the behavior of an object. Constraints are attributes of each object, are associated with methods of the object and corresponding constraints are checked when method invocations are made on the object. If a check indicates that a corresponding constraint is violated the method invocation is not completed, which can result in an error message/code being returned to the invoker of the method. Constraints can be placed on an object such that it will be unavailable as an input and/or an output of a model. Types of constraints include but are not limited to dependency constraints, permissions/access control constraints, data type constraints, units constraints and message propagation constraints.

A dependency constraint can be added to a data object when the data object's value is set by a function object. While the constraint is in place, only that function object corresponding to the constraint can set the value of the data object. Objects that are dependent on other objects can only be outputs (read-only) because their values are constrained by that dependency. Once an object has a dependency constraint additional dependency relationships can not be created with other function objects. Dependency constraints prevent loops from being formed in the relationships between objects.

Access/permission settings are another way in which to create constraints on an object. Information specifying which users or objects can view, edit, execute (solve) or administrate an object are placed in an access policy constraint. Invocations of methods on objects that have access constraints are only permitted if the invoker is listed in the constraint as having permission to invoke the method. For example, a getValue method can only be invoked by an invoker with view permissions in the corresponding access constraint. Objects are only outputs for users with read-only permissions for those objects (e.g., a read-only object can not be written by another function object). Objects are only inputs for users with write-only permissions for those objects. Objects are inputs and outputs for users with read-write permissions for those objects.

Message propagation constraints are checked when a message is sent and/or received, which can prevent messages from being sent or received. Message propagation constraints can reference message routing information such as source and destination object references and message content information such as the new or old value associated with a value change of a data object. Access constraints are also used as message constraints to prevent users from obtaining data in messages for objects for which they do not have permissions to view data. A "trigger" message constraint on a function object determines when a function object is "triggered" to solve its expression. Trigger constraint modes include: "any", "all", "none" and "custom". The "any" trigger allows a function object to solve when any object referenced by function sends a message that it changed, whereas "none" prevents automatic re-evaluation when objects referenced by the function object change. The "all" trigger requires that all objects referenced by the function send change messages in order for a re-evaluation to occur. The "custom" trigger is a hook provided for another object to determine if a function should be solved.

Data objects contain data as attributes and provide methods for getting and setting the attributes. A data object sends a change message to objects registered to listen for change messages when the data object changes. A number data object is an example of a data object implemented by the present invention. A number object has a name, value and units attributes, as well as an access policy constraint associated with the methods of the object. When values of data objects are set, coercion is performed using common techniques and rules. Data objects that are coercible without data loss are coerced. Coercion that could result in data loss is detected and can be flagged for approval by a user.

A unit is a particular physical quantity, defined and adopted by convention, with which other particular quantities of the same kind are compared to express their value. The International System of Units (SI) defines seven base units:

| | |
|---|---|
| length | meter, |
| mass | kilogram, |
| time | second, |
| electric current | ampere, |
| thermodynamic | temperature, |
| amount of substance | mole, |
| luminous intensity | candela. |

Function objects provide behavior by providing expressions that can relate data objects and function objects thereby creating networks of linked function objects and data objects. Function objects have a name, an expression, an object reference table and a solver attribute as well as access policy and trigger message propagation constraints. The expression can be thought of as a function with a plurality of inputs and output objects, which is evaluated by the solver. The expression text can be defined using various programming languages including Basic, C, C++ and Java, among others. The object reference table can contain references to data objects and function objects. The expression text can contain portions that specify method calls on the objects referenced in the object reference table. The solver evaluates the expression text, which may result in changes to objects referenced by the function object. Solvers can be implemented using compilers, interpreters or entire legacy applications. The function object solves the expression when a change message is received from one of the objects referenced by the function object. Function objects can also be solved manually by a user. Dependency constraints are optionally placed on data objects that have their values set by the expression of a function object.

An equivalence function object is an example of a function object implemented with the present invention. The following simplified example illustrates an equivalence function object that keeps several data objects equivalent (i.e., if one of the data object values changes, then the other data object values are changed such that their values match). In this example, the equivalence function is used in combination with a number data object, further providing an example of a message propagation constraint being applied.

```
function object: equivalence {
    referenced objects table
    receive message {
        if (constraints are met) {
            solve the function expression using solver( )
        }
    }
    function expression {
        get the changed object value
        for (each referenced table entry) {
            if (reference does not correspond to changed object) {
                set referenced object value to the obtained object value
            }
        }
    }
    solver {
        solve the function expression . . .
    }
    access policy constraints {
        check invoker permissions . . .
    }
    add object reference {
        add an entry in the referenced objects table
        register with the object to enable message receiving
    }
    remove object reference {
        remove an entry in the referenced objects table
        de-register with the object to disable message receiving
    }
}
data object: number {
    table of object references of registered message receivers
    name
    value
    set value method {
        set number value to new value
        for (each reference table entry) {
            if (message propagation and access constraints are met)
                send a message to referenced object indicating
                    value has changed
        }
    }
    get value method {
        provide number value to requester;
    }
    message propagation constraint {
        if (reference corresponds to the object value changer) {
            disallow the message to be sent
        } else {
            allow message to be sent
        }
    }
    access policy constraint {
        all users and/or objects can get and set the name and value
    }
    add object reference {
        add an entry in the table of object
        references of registered message receivers
    }
    remove object reference {
        remove an entry in the table of object
        references of registered message receivers
    }
}
```

A model is generated by creating instances of data objects and/or function objects. In the process of generating, the contents of an object can be obtained from and coordinated with the data and or functions of a legacy application using the known application programming interfaces (APIs) of the application. For example, a data module can have its value match that of a cell in a spreadsheet.

An object is made available by publishing it. Publishing is done using standard distributed object management techniques whereby objects are made available in a standard way to be activated and used by a subscriber to the object. When published, each data object and function object has an object reference that can be used to access and control that object. Once an object is published, the object's object reference, usually a URL, is communicated to prospective users via conventional techniques (e-mail, posting a message), or a prospective user initiates a search that reveals the object reference of the published object.

A object is subscribed to by adding the object reference to the referenced objects table of a function object. This also results in have a reference to the function object placed in the table of message recieves of the referenced object, which is a standard part of enabling messages to be sent from referenced objects to referencing objects.

When a referenced object changes a message will be sent to any referencing objects which will solve their expressions subject to constraints. Solving the expressions may result in data objects being changed.

At any time additional objects can be generated, published and subscribed to by different users or objects representing users. As these steps are carried out a network of linked data objects and function objects emerges which is an emergent model. These steps can also be guided by a definition of a network of objects that is desired.

The values of the data objects of an emergent model can be optimized. Standard optimization packages are available that can be interfaced in known ways to an object environment such as the one described in the present invention. For example, known optimization algorithms can be accessed by the expression of a function object so that the optimization algorithm will be run when the function object is solved. Objects are identified as inputs and outputs for the optimization algorithm to use. The optimization algorithm is given a set of typical criteria for stopping the algorithm to prevent too many resources from being consumed. When the optimization algorithm is run it changes the input objects according to the algorithm design and the resulting changes to the output objects. The output objects change because they are linked to the input objects in a network of function objects and data objects. The optimization stops when the stopping conditions are reached, after which the optimal values of the data objects can be viewed or accessed by other data objects.

FIG. 1 illustrates a computer network 50 on which an embodiment of the present invention is implemented. A computing device 100 provides processing, storage and input/output devices for generating and viewing an emergent model 300. Computing device 100 is connected to a respective keyboard 102 and mouse 104 for receiving input and a respective display 106 for presentation of content. In one embodiment, computing device 100 is a personal computer. Computing device 100 is also linked to a communications network 110 having access to other computing devices 100a,b with respective input/output devices 102a,b, 104a,b and 106a,b. The communications network 110 is part of the Internet, the worldwide collection of computers, networks and gateways that use the TCP/IP suite of protocols to communicate with one another. The Internet provides a backbone of high-speed data communication lines between major nodes or host computers, consisting of thousands of commercial, government, educational, and other computer networks, that route data and messages. Computing devices 100 connected to the communications network 110 hosts models and legacy applications used in the generation of an emergent model. These models are displayed on display 106 for viewing by a user of an embodiment of the present invention.

Figure 2:
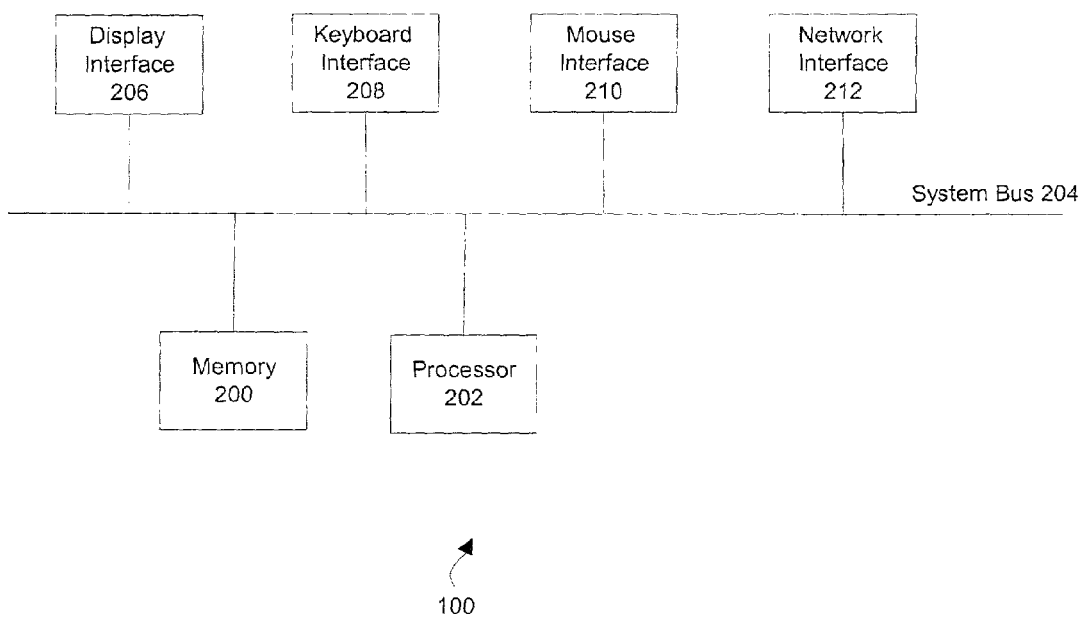
FIG. 2 shows the internal structure of a computing device on the computer network of FIG. 1.

FIG. 2 shows the internal structure of a computing device 100 in the computer network 50 of FIG. 1. The computing device 100 contains a system bus 204, a bus is a set of hardware lines used for data transfer among the components of a computing device 100 on computer network 50. A bus 204 is essentially a shared highway that connects different parts of a system (e.g., processor, disk-drive controller, memory, and input/output ports) which enables the different parts to transfer information. Attached to system bus 204 is display interface 206, display interface 206 allows display 106 to communicate with other components on system bus 204. Keyboard interface 208 and mouse interface 210 are also attached to system bus 204 and allow the input devices to communicate with other components on system bus 204. Network interface 212 provides the link to an external network (e.g., communications network 110), allowing processes running on computing device 100 to communicate with other computing devices 100 connected to a communications network 110. A memory 200 stores computer software instructions and data structures used to implement an embodiment of the present invention. A processor 202 executes instructions stored in memory 200, allowing the computing device 100 to participate in the generation of an emergent model.

Figure 3:
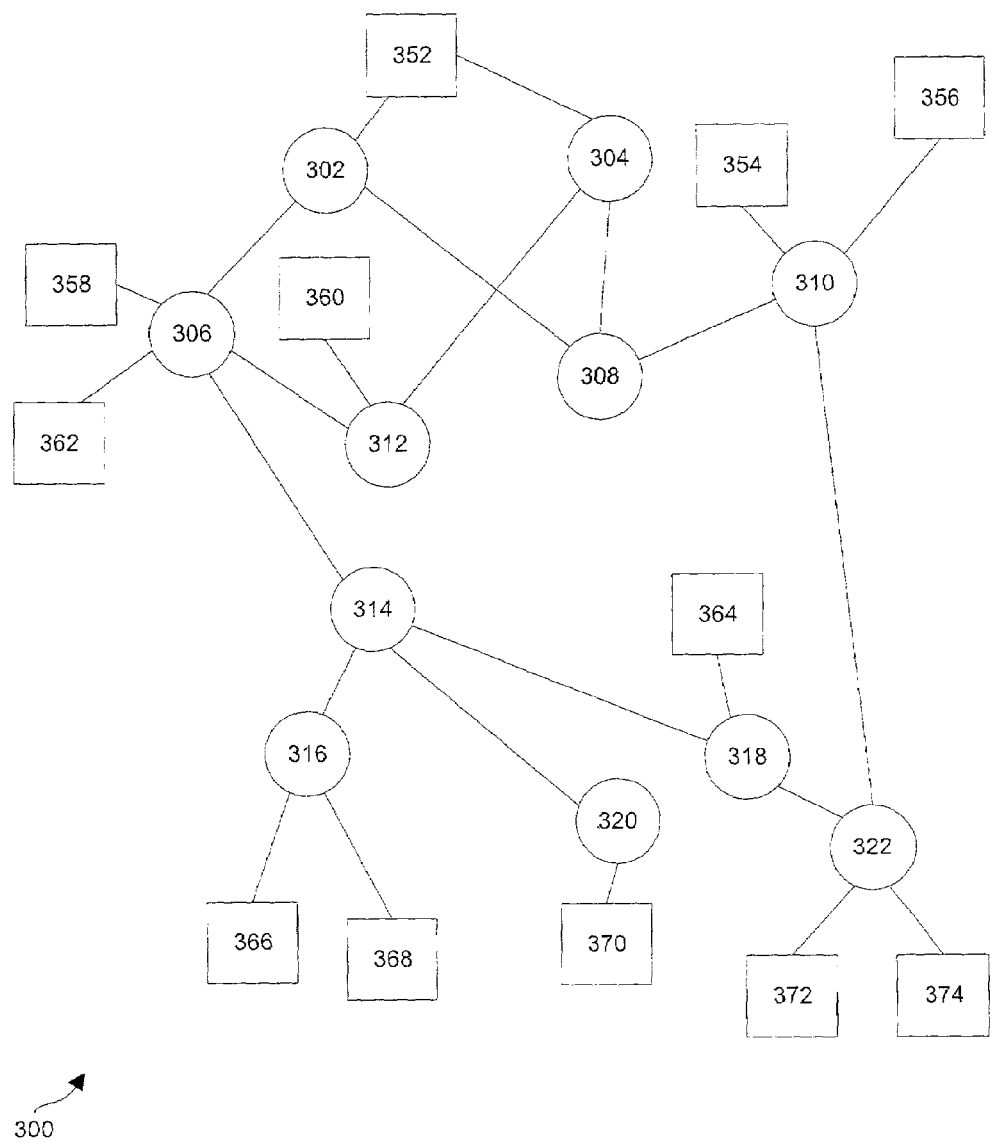
FIG. 3 illustrates a decentralized model composed of interconnected computing devices hosting models and legacy applications as generated by an embodiment of the present invention.

FIG. 3 illustrates an emergent model composed of interconnected computing devices hosting models and legacy applications as generated by an embodiment of the present invention. An emergent model 300 is a model that is created without a predefined or global definition, such that the emergent model 300 arises from a dynamic, integrated objects built on a distributed, multiple computing device, computer network 50. Servers 302–374 host the models (302–322, shown as circles) and legacy applications (352–374, shown as squares) that make up emergent model 300.

Models (302–322) are collections of computer instructions and data that present an interface for describing the behavior of part of a system being modeled, such that the interface is understood by other parts of the system. This interface is one means by which models communicate the outputs that they produce and the inputs that they require. The models (302–322) may store data using their own storage subsystem or they may use a common data repository. The objects themselves can be stored within a file system, a database or a product data management system.

Legacy applications (352–374) are collections of computer instructions that present an interface existed prior to the use of a newer system. Legacy applications (352–374) require a change in process or technique, such as translating data files formats in order to interface with the new system being modeled. Often this translation is accomplished through the use of "wrappers" provided by the new system. These wrappers allow legacy applications (352–374) to interface with models (302–322) to generate an emergent model 300. Additionally, objects of the present system can interface with legacy applications through code libraries loaded by these applications, using the legacy application's API. Although the existence of legacy applications (352–374) is not required for the creation of an emergent model 300, their use often reduces the time required to generate an emergent model. Legacy applications (352–374) may also include enterprise-wide tools, such Enterprise Resource Planning ("ERP") systems (e.g., SAP R/3 from SAP America Inc. in Newtown Square, Pa.).

An example of an emergent model 300 that includes models (302–322) and legacy applications (352–374) is an emergent model 300 for modeling the product design of a power tool. Aspects of the power tool product design, including its shell and motor as well as its performance, environmental impact and cost are modeled. A model for the shell of the power tool may already exist in a conventional mechanical design tool (e.g., Pro/ENGINEER from PTC Corporation in Waltham, Mass.) and a model relating to its environmental impact may already exist in a spreadsheet tool (e.g., Microsoft® Excel from Microsoft Corporation in Redmond, Wash.). These legacy applications (352–374) are associated with native models (302–322) for the power tool motor, performance and cost to generate an emergent model 300.

Figure 4:
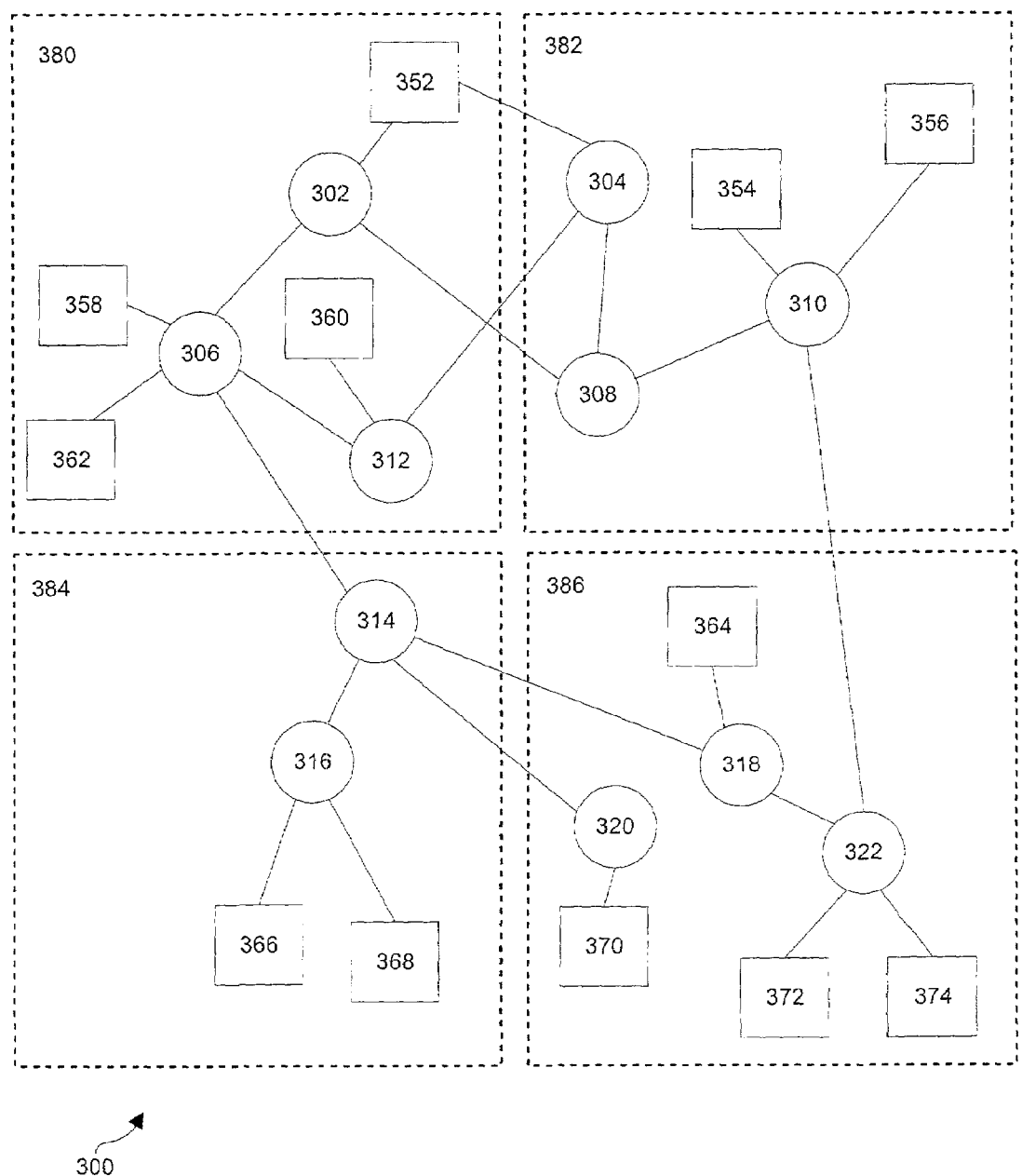
FIG. 4 illustrates a decentralized model composed of interconnected computing devices hosting models and legacy applications configured and stored on multiple computing devices on a computer network by an embodiment of the present invention.

FIG. 4 illustrates an emergent model composed of interconnected computing device hosting models and legacy applications configured and stored on multiple computing devices in a computer network by an embodiment of the present invention. The computing devices (302–374) which host the models (302–322) and legacy applications (352–374) are typically organized into groups for effective management and control. Each computing device configuration (380–386) represents groupings of computing devices (302–374). Configuration 380 may be a department within a larger company, configurations 382 and 384 maybe separate companies involved in a partnership. Configuration 386 may be a outside consulting group contracted to provide a model. These configurations (380–386) need not be symmetric and their organization places no restriction on the communications capabilities of the models (302–322) and legacy applications (352–374) running within them.

Figure 5:
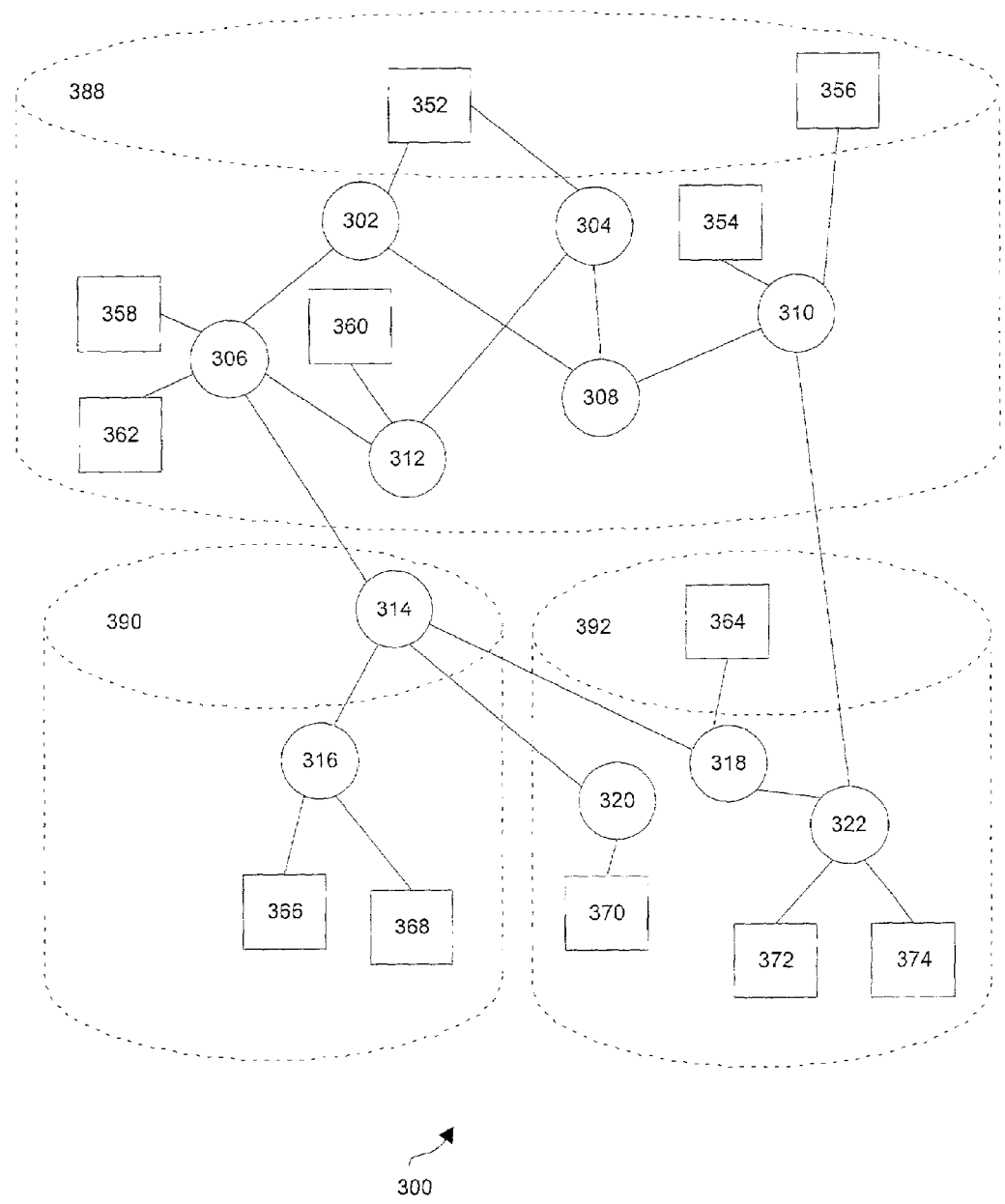
FIG. 5 illustrates a decentralized model composed of interconnected computing devices hosting models and legacy applications where multiple configurations share a common repository as used by an embodiment of the present invention.

FIG. 5 illustrates an emergent model composed of the interconnected computing devices hosting models and legacy applications of FIG. 4, where the multiple configurations (380–386) share a common repository as used by an embodiment of the present invention. Models describing the behavior of a system often contain large amounts of data, this data can be managed by a central repository for effective access and control. For example, data used in the product design modeling process can be managed by conventional product data management ("PDM") systems (e.g., Metaphase® Enterprise™ by Structural Dynamics Research Corporation of Milford, Ohio). PDM systems can provide effective storage and version management capabilities useful in the development of a large product design model. These systems can assist in the management of emergent models. In FIG. 5 a PDM data repository 388 is used to store portions of the emergent model running on configurations 380 and 382 of FIG. 4, whereas configuration 384 is stored in repository 390 and configuration 386 is stored in repository 392.

Figure 6:
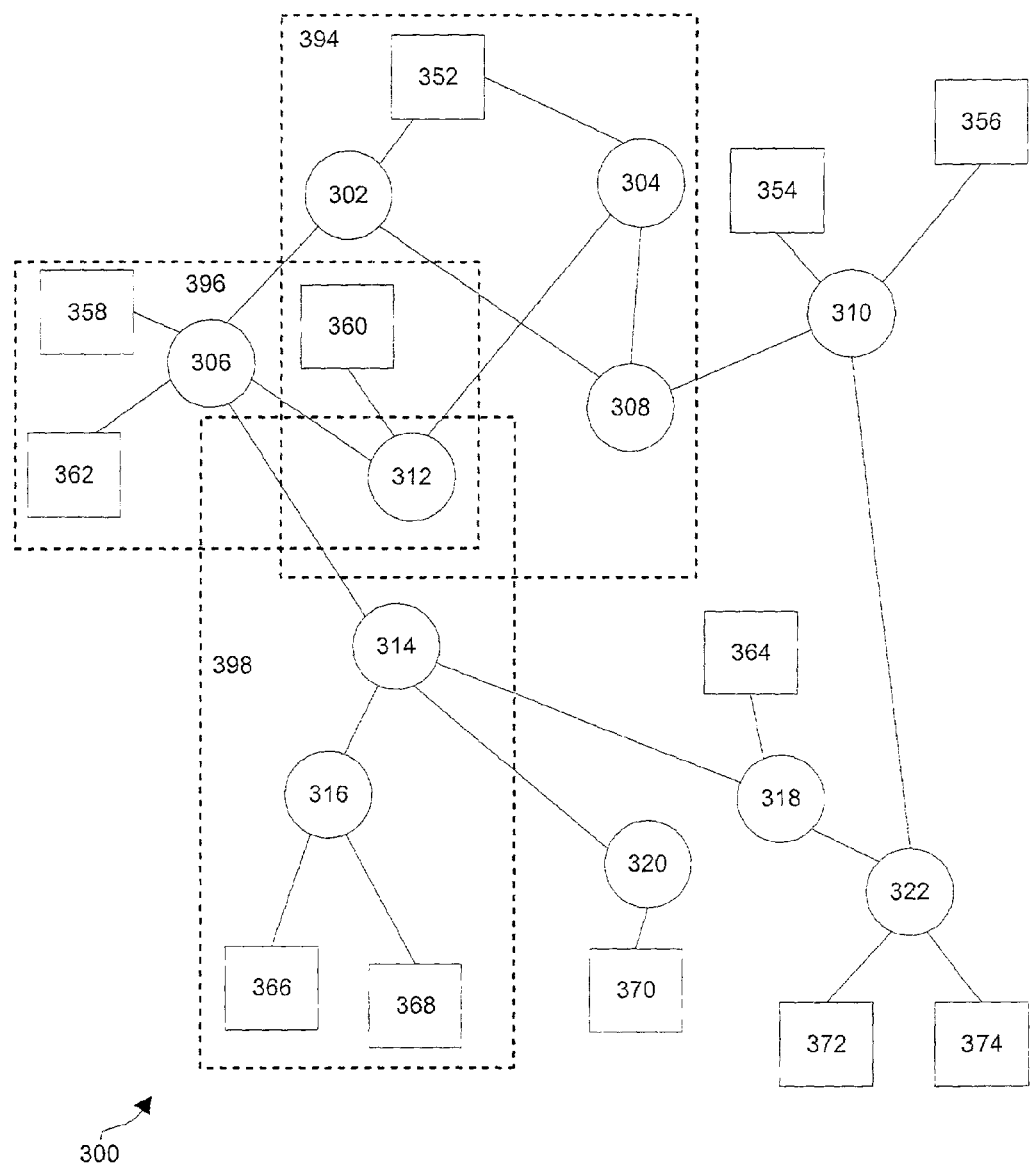
FIG. 6 illustrates a decentralized model composed of interconnected computing devices hosting models and legacy applications grouped by the interdependancy between the models as generated by an embodiment of the present invention.

FIG. 6 illustrates emergent model 300 composed of interconnected computing device hosting models and legacy applications of FIGS. 4 and 5, grouped by the interdependency between the models as generated by an embodiment of the present invention. For example, one set of interdependencies produces a motor performance model 394 which utilizes underlying model 302 for motor speed analysis, model 304 for friction analysis and model 312 for electric current analysis, with legacy application 352 providing torque requirements analysis and legacy application 360 providing motor cost analysis. Similarly, environmental impact model 396 and overall cost model 398 utilize underlying models and legacy application when run. Each of these grouped models contributes to the generation of emergent model 300.

Figure 7A:
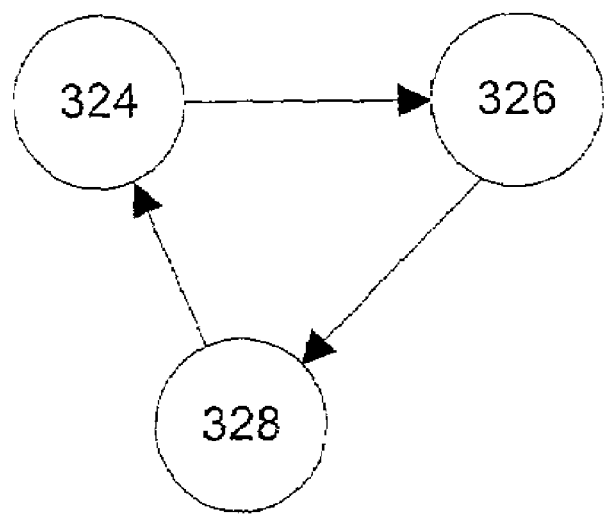
FIG. 7a illustrates models communicating in a unidirectional manner according to an embodiment of the present invention.

FIG. 7a illustrates models communicating in a unidirectional manner according to an embodiment of the present invention. The outputs of one model may be the inputs to another model, either directly, or indirectly. Communication among models need not be symmetric; that is, a model may accept inputs from another model to which it supplies no outputs and visa versa. For example, a model 324 may supply its outputs as inputs to model 326. Model 326 may supply its outputs to model 328 as inputs, model 328 which may in turn supply its outputs back to model 324. Because publishing and subscribing among various models may create circular dependencies, emergent model 300 contains a process for detecting and address circular dependencies, thus preventing models from running in infinite loops where desired.

The inputs of a model are made available by publishing the model in such a way that another model requiring inputs subscribes to them. Traditionally, providers of components might publish their availability in paper catalogs, designers would then look for a component that match their criteria in the catalog. If a conforming component was found, its parameters could then be used to model an aspect of the system of interest being modeled. In an integrated and distributed model implemented on a computer network this publish and subscribe mechanism can be emulated by connecting the various inputs and outputs of the models in such a way that an emergent model is created when underlying models are run.

Figure 7B:
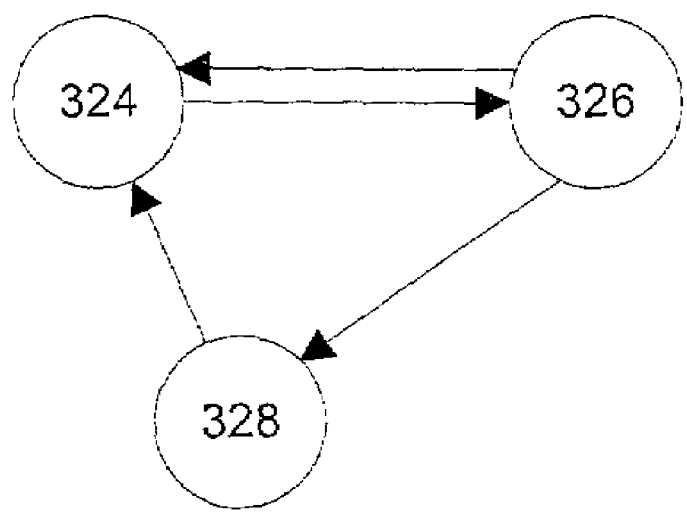
FIG. 7b illustrates models communicating in a bidirectional manner according to an embodiment of the present invention.

FIG. 7b illustrates models communicating in a bi-directional manner according to an embodiment of the present invention. As noted in the discussion of FIG. 7a; the outputs of one model may be the inputs to another model, either directly, or indirectly. When two models directly share their inputs and outputs their communication is said to be bi-directional. Model 324 in FIG. 7b produces some outputs used by model 326 and model 326 produces some outputs used by model 324, this is an example of bi-directional communication.

Figure 8A:
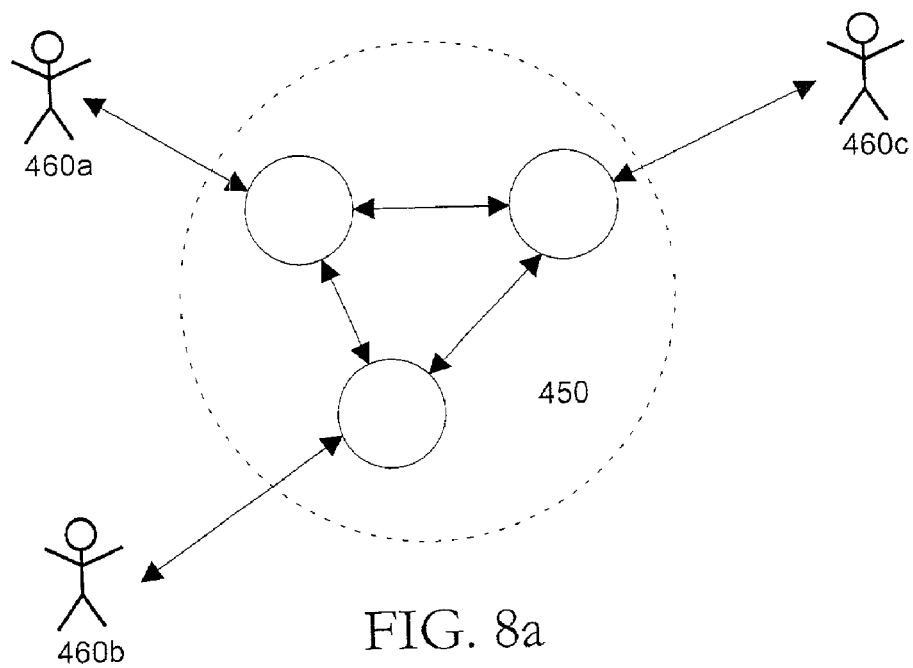
FIG. 8a illustrates a decentralized model usable as a portion of a further decentralized model according to an embodiment of the present invention.

FIG. 8a illustrates an emergent model usable as a portion of a further emergent model according to an embodiment of the present invention. Models describe the behavior of a system being modeled. Underlying behaviors are grouped into models of their own, creating a hierarchy of models within models (sub-models). Models are therefore scalable. Models can be organized by their interdependencies as well as by which server they might be associated with. For example, users 460a–c interact with the sub-models of model 450 to generate an emergent model.

Figure 8B:
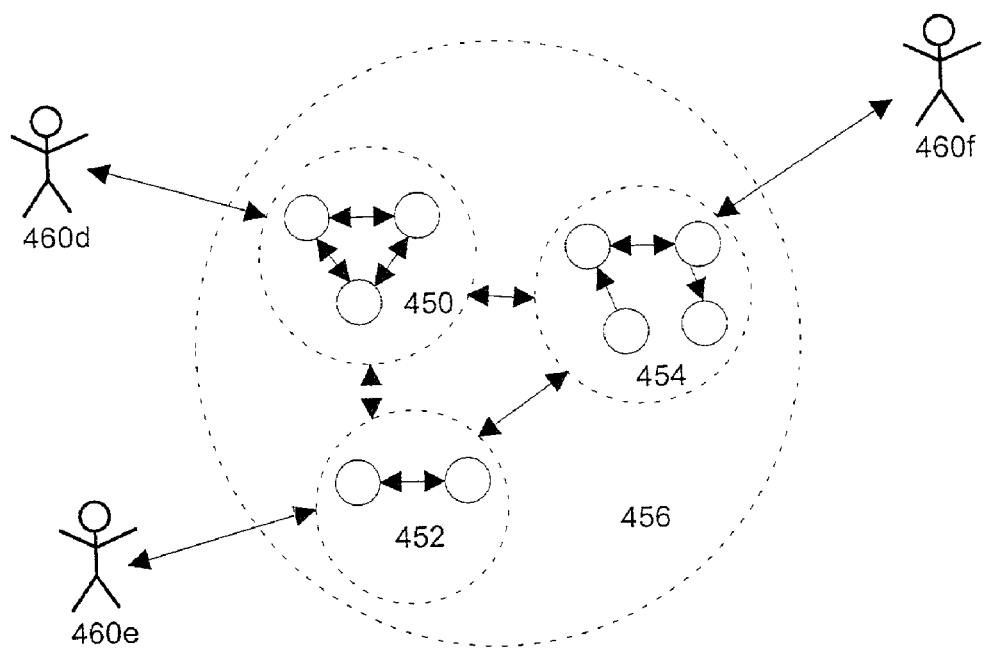
FIG. 8b illustrates a decentralized model used as a portion of a further decentralized model according to an embodiment of the present invention.

FIG. 8b illustrates an emergent model used as a portion of a further emergent model according to an embodiment of the present invention. The model 450 is combined with other models (452, 454) to generate emergent model 456. This ability to combine sub-models, without a predefined model definition, facilitates the creation of large emergent models, for example emergent model 456.

Figure 9A:
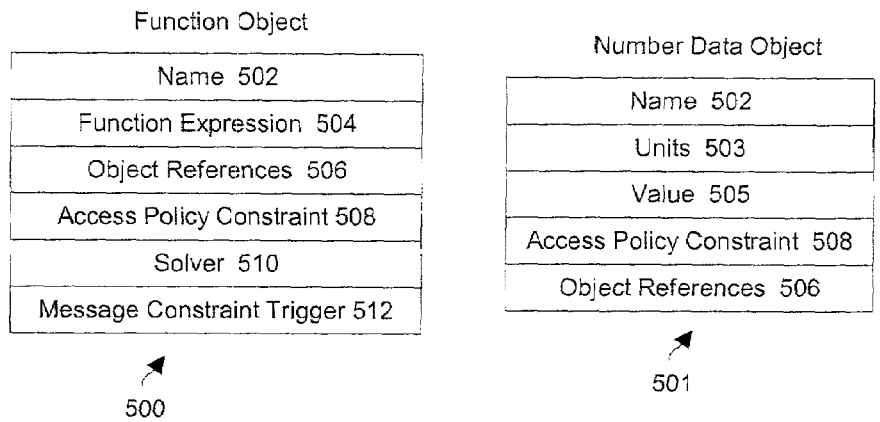
FIG. 9a illustrates an object-oriented design for use in implementing a method of generating a decentralized model composed of interconnected computing devices hosting models and legacy applications by an embodiment of the present invention.

FIG. 9a illustrates an object-oriented design for use in implementing a method of generating an emergent model composed of interconnected computing device hosting models and legacy applications by an embodiment of the present invention. Object classes 500 and 501 are example classes that define multiple attributes/fields (502–512) used for describing the state and behavior of a model. Instances of object classes 500 and 501, in addition to other object classes, are used to create an emergent model. Object class 500 lists the attributes/fields that define a function object and object class 501 lists the attributes/fields that define a number data object. Name field 502 is a moniker for referencing an object. Units field 503 defines the units of measure for the value field 505 stored as part of a number data object. An access policy constraint field 508 is defined to control access to objects by users 460a–f. Many access configurations are possible based upon the desired level of viewing, editing, executing and administrating appropriate of each object within the emergent model. At a minimum, access policies 508 covering private and public access are implemented. Trigger message propagation constraint 512 controls the timing of re-evaluation of the function object. As described above, trigger modes include: "any", "all", "none" and "custom". Expression 504 defines the object relationship between the object references 506. Solver 510 solves/executes the expression 504 and updates the objects in object references 506. Object references 506 provide the solver access to methods on referenced objects, such as for getting and setting the values of referenced objects.

Figure 9B:
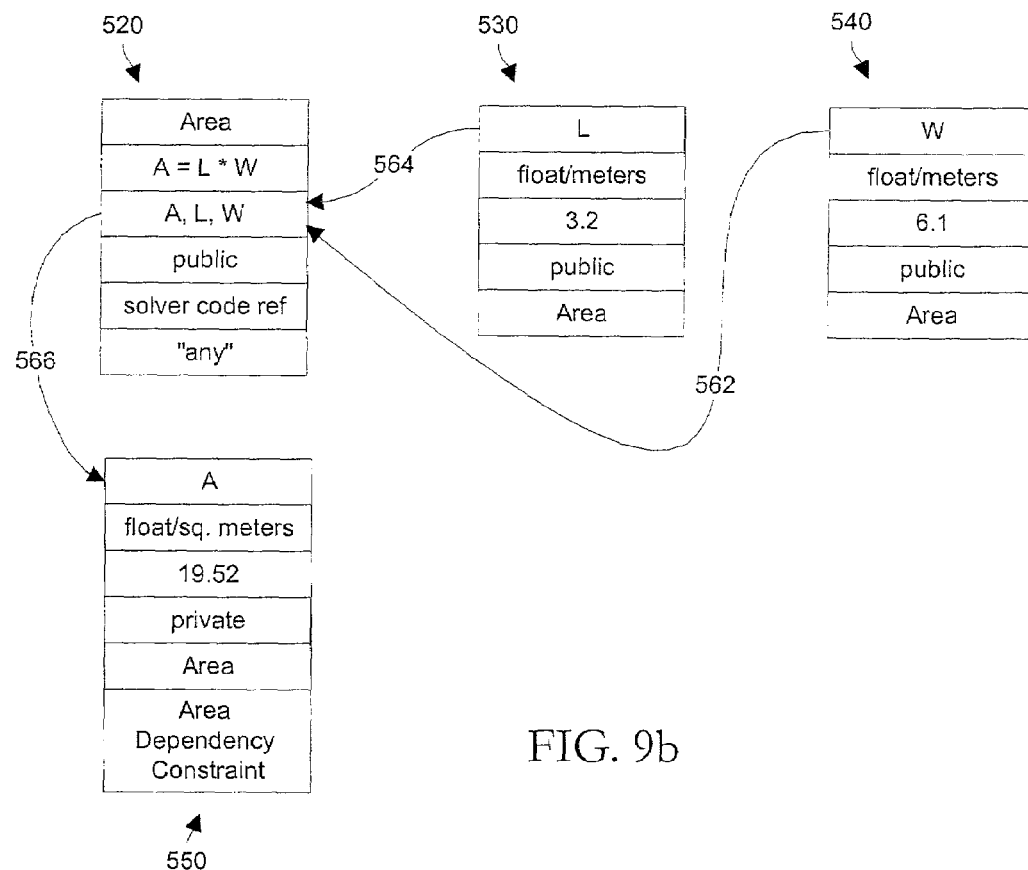

FIG. 9b illustrates an example model defined using the object-oriented design defined in FIG. 9a. A simple model presenting an object that describes the square footage of an area (i.e., A=L*W) is generated using objects instantiated from object classes 500 and 501. Object 530, representing the length of the area is defined by the object named "L", having a units attribute of "meters" and a value of "3.2". An access policy attribute 508 is used to control user 460a–f access to an object. A setting of public access signals that all users 460a–f of the computer network are able to access this object, while a private access policy may indicate only users 460a–f of a certain privilege level have access to this object. In a similar fashion to length object 530, width object 540 defines a value for the width of the area. Objects (e.g., area object 520) needing the values of these objects access the objects using methods provided on them (e.g., Object-.getValue( )). Area function object 520 stores the equation "A=L*W" as its expression 504. Function object 520 then uses solver 510 which gets the values of length object 530 and width object 540 to determine the value of object 550.

Length object 530 and width object 540 are unconstrained either by dependencies or by access/permissions (both have public access). Area object 550 is constrained as read-only due to the fact that its value is determined by solver 510 of area function object 520. Additionally, area object 550 is defined as private for access/permissions indicating that some users have restricted access to its value.

Figure 9C:
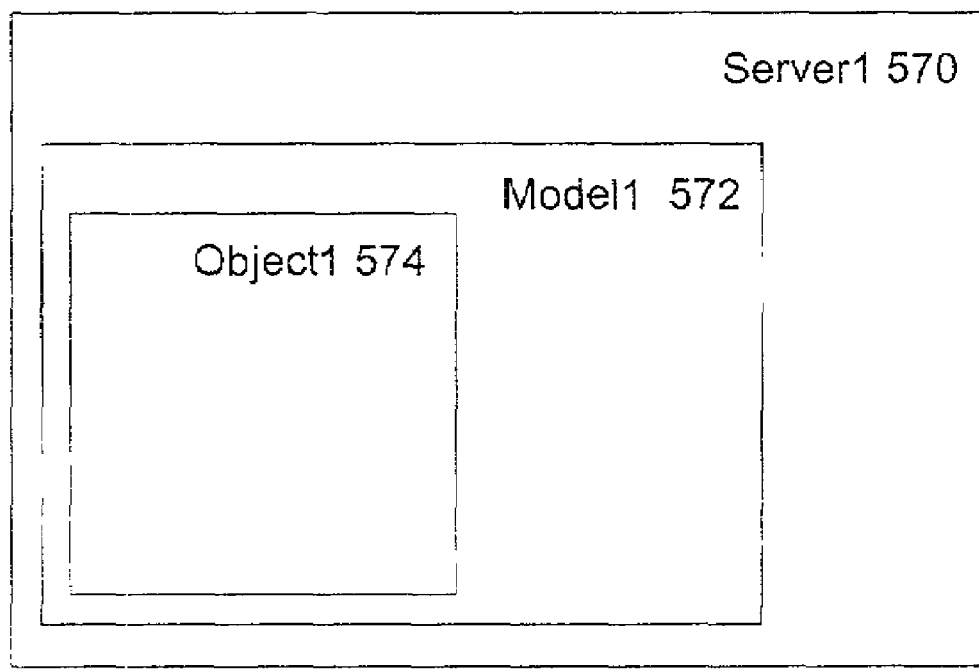
FIG. 9c illustrates an example model organization hierarchy.

FIG. 9c illustrates an example model organization hierarchy. Generally a server contains a plurality of models and a model contains a plurality of objects. Servers are logical constructs used to organize models. In FIG. 9c Server1 570 contains Model1 572 and Model1 572 contains Object1 574. Addressing these servers, models and objects is done using URL/URI addressing where the server, model and object hierarchy is represented by an address in the form "server/model/object" (e.g., "Schema://ServerA IP address:port/ModelA/ObjectB"). This addressing is used by the publish/subscribe steps to link objects.

Figure 10:
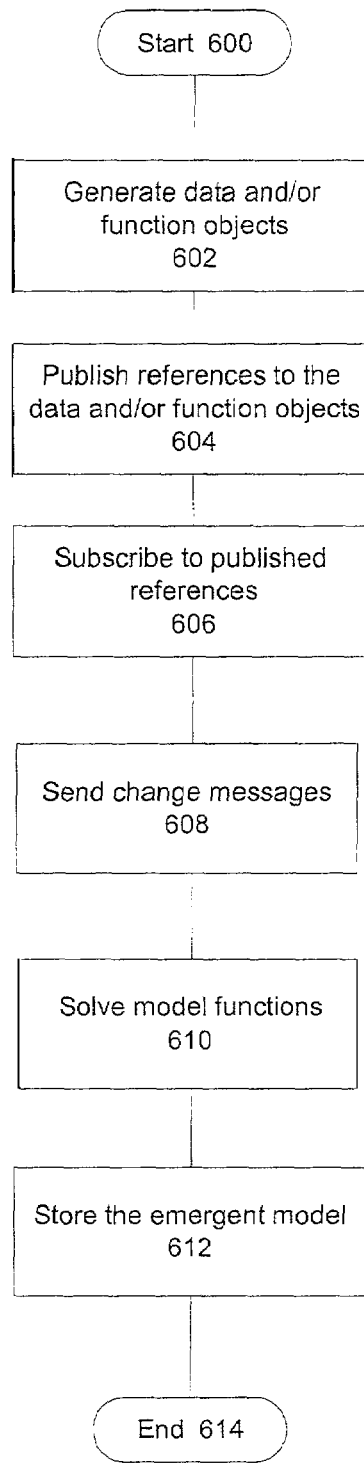
FIG. 10 is a flowchart of a process for generating a decentralized model on a computer network according to an embodiment of the present invention.

FIG. 10 is a flowchart of the process of generating an emergent model according to an embodiment of the present invention. The process begins at step 600, at step 602 data and/or function objects are generated to create a model. For example, area object 520 (FIG. 9b) represents a model generated according to step 602. Typically, a user is guided to generate objects by a user interface whereby commands can be issued to create objects and further commands can be issued to specify the values of the attributes/fields of those objects. At step 604, references to generated objects are published by making the object references available or known, such as through electronic media, print media or human conversation. At step 606, function objects or data objects are subscribed to by referencing the objects in function objects. For example, area function object 520 (FIG. 9b) subscribes to objects 530, 540 and 550 (FIG. 9b). At step 608, when changes are make to referenced data objects and/or function objects messages are sent to the referencing data objects and/or function objects. At step 610, when a function object receives a message that a referenced object changed and the function object does not filter the message, the function object solves its expression. Solving the expression may result in calling methods on the referenced objects, such as getting and setting the values of data objects or initiating the solvers of function objects. Solving the expression can result in changes in values of referenced objects which can result in additional messages being sent. At step 612, each object on each computing device is optionally stored when it is created, when the object changes or as needed. Storage of the individual objects results in the emergent model being stored in computing devices on the computer network, providing users the ability to further interact and enhance the emergent model.

Figure 11A:
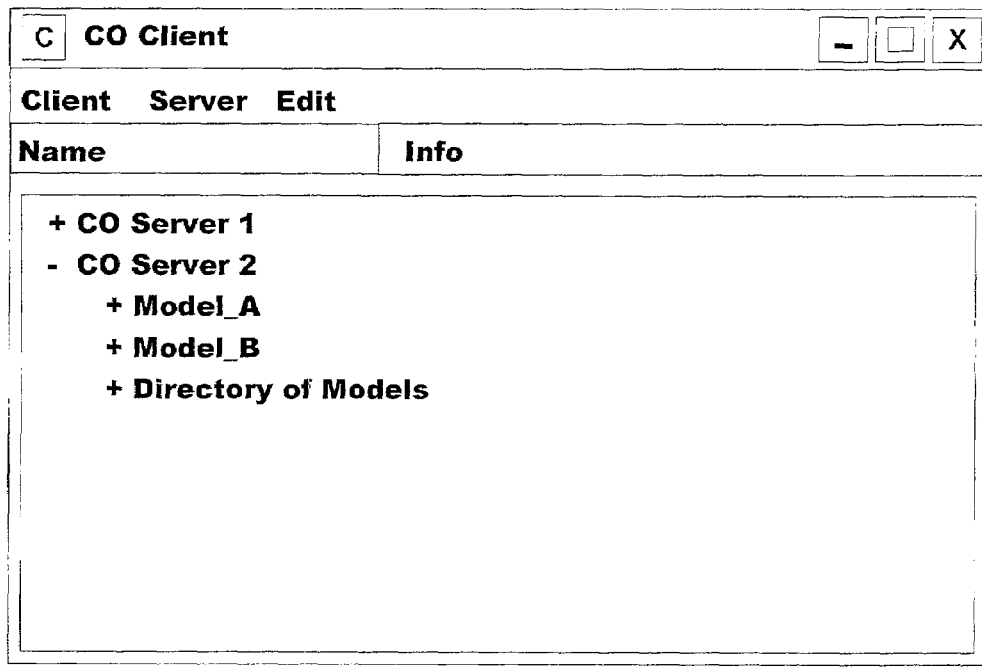
FIGS. 11a and 11b illustrate a graphical user interface for use in generating a decentralized model on a computer network according to an embodiment of the present invention.
Figure 11B:
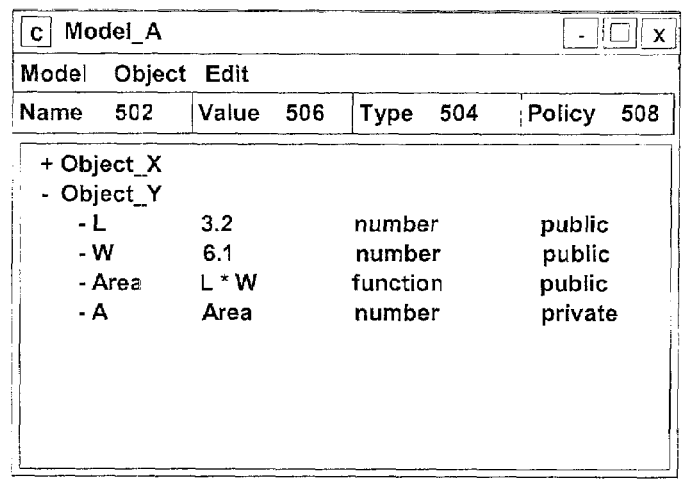

The emergent network of linked data objects and/or function objects are independently published to, and subscribed to, in a manner free of a globally predefined network of data object and/or function objects, thereby generating the emergent model. As described in the discussion of FIGS. 4 and 5, the storage of the emergent model may occur on preexisting configurations with or without the use of a separate repository. The process ends at step 614. FIGS. 11a and 11b illustrate a graphical user interface for use in generating an emergent model according to an embodiment of the present invention. In this example two windows (FIGS. 11a and 11b) are presented to show a model defined using hierarchical relationship of servers, models and objects. Here, a server acts as a repository for models and directories of models. Models are built from objects (e.g., sub-models) and objects contain model objects and other models. Some aspects of object-oriented model class 500 are shown in FIG. 11b, including name 502, value 506, type/units 504 and access policy 508.

This example shows the area object 520 defined as Object_Y, where Object_Y, along with Object_X, is contained in Model_A. Model_A is stored on CO_Server_2, along with Model_B and a Directory of Models. This hierarchy represents only one arrangement for defining area object 520, other model organizations could be generated to define an equivalent model.

Figure 12A:
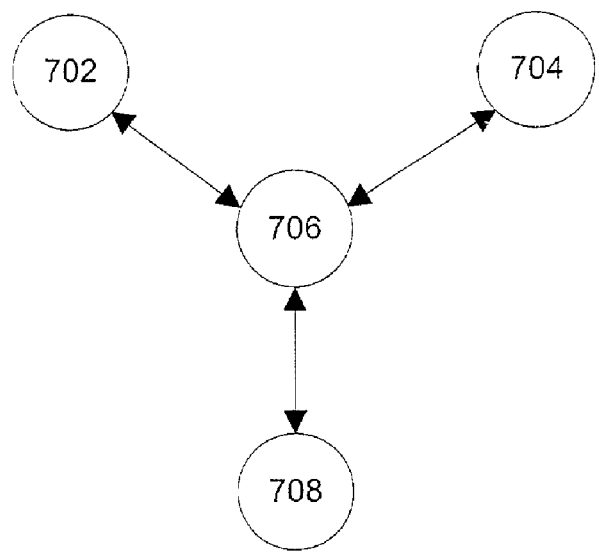
FIGS. 12a and 12b illustrate networks of computing devices.
Figure 12B:
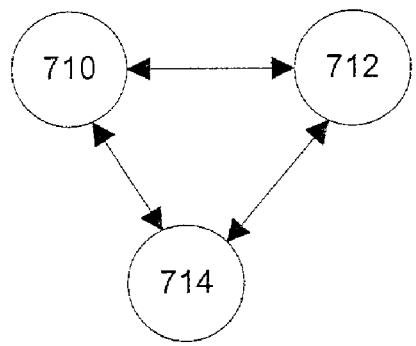

FIGS. 12a and 12b illustrate networks of computing devices. The present invention provides for creating networks with zero or more than one coordinating computing device. FIG. 12a comprises computing devices 702, 704, 706 and 708. Computing device 706 is a coordinating computing device. Coordinating computing devices orchestrate communications between computing devices on a computer network. For example, in order for computing device 702 to send a message to computing device 708, the message must be coordinated through coordinating computing device 706. In contrast, FIG. 12b shows a network of computer devices 710, 712 and 714 that lack a single (or central) coordinating computing device (e.g., coordinating computer device 706 of FIG. 12a). In the network of computing devices depicted by FIG. 12b, messages are sent directly from one computing device to another computing device, without indirect coordination. For example computing device 710 can send a message to computing device 712.

While this invention has been particularly shown and described with references to preferred embodiments thereof, it will be understood by those skilled in the art that various changes in form and details may be made therein without departing from the scope of the invention encompassed by the appended claims. Specifically, combinations of data objects and/or function objects form a model according to the present invention.

What is claimed is:

1. A method of generating a decentralized model on a computer network, the decentralized model including one or more models having computer instructions and data that describe behavior of a system and/or evaluate the system, comprising the steps of:

generating data objects and/or function objects, at least some of the data objects and/or function objects being model inputs and/or model outputs, at least some of the function objects defining interdependencies within a model by providing solvable expressions that relate data objects and/or function objects;

publishing identifiers for the data objects and/or the function objects;

based on the published identifiers, subscribing to the data objects and/or the function objects by creating relationships between the data objects and/or the function objects by referencing the data objects and/or the function objects within the function objects, thereby linking the data objects and/or the function objects, wherein networks of linked data objects and/or function objects emerge, said references utilizing the published identifiers;

sending messages to referencing data objects and/or function objects when referenced data objects and/or referenced function objects change;

invoking methods on data objects and/or function objects when data objects and/or function objects require information;

solving the expressions within the function objects when the messages are received;

storing the data objects and/or the function objects in a central location on a single computing device or in a distributed manner across multiple computing devices on a computer network; and wherein the relationships between the data objects and/or function objects are created without using a single coordinating computing device, or are created using multiple coordinating computing devices on the computer network.

2. The method of claim 1 wherein at least a part of the configuration of the networks of linked data objects and/or function objects is predefined and used to determine which data objects and/or function objects are generated on which of the computing devices in the computer network.

3. The method of claim 1 wherein a user interface is defined that displays the data objects and/or function objects on a computing device on the computer network using a client process that communicates with a server process wherein the data objects and/or function objects can be viewed on any computing device connected to the computer network.

4. The method of claim 1 wherein the data objects and/or function objects are stored in logical groups.

5. The method of claim 4 wherein the logical groups are defined by geography, business organization or site.

6. The method of claim 1 wherein the references to the data objects and/or function objects are published using electronic media, print media or human conversation.

7. The method of claim 6 wherein the electronic media is indexed and searchable.

8. The method of claim 1 wherein the step of generating the data objects and/or function objects provides an interface mapping for data objects and/or function objects stored in application programs, databases or computer code libraries.

9. The method of claim 1 wherein the function objects are implemented by computer code that is compiled, dynamically linked and evaluated at runtime.

10. The method of claim 1 wherein the function objects are implemented by computer code that is interpreted and evaluated at runtime.

11. The method of claim 1 wherein the sending or receiving of messages can be enabled or disabled based on predefined criteria.

12. The method of claim 11 wherein the criteria is based upon message source, message destination or message contents.

13. An apparatus for generating a decentralized model on a computer network, the decentralized model including one or more models having computer instructions and data that describe behavior of a system and/or evaluate the system, comprising:

data objects and/or function objects, at least some of the data objects and/or function objects being model inputs and/or model outputs, at least some of the function objects defining interdependencies within a model by providing solvable expressions that relate data objects and/or function objects;

identifiers for the data objects and/or the function objects, the identifiers being published and enabling subscriptions to the data objects and/or function objects;

subscriptions to the data objects and/or the function objects generated by creating relationships between the data objects and/or the function objects by referencing the data objects and/or the function objects within the function objects, thereby linking the data objects and/or the function objects, wherein networks of linked data objects and/or function objects emerge;

messages sent to referencing data objects and/or function objects when referenced data objects and/or referenced function objects change;

an invoker component invoking methods on data objects and/or function objects when data objects and/or function objects require information;

a solver component solving the expressions within the function objects when the messages are received;

a storage component storing the data objects and/or the function objects in a central location on a single computing device or in a distributed manner across multiple computing devices on a computer network; and wherein the relationships between the data objects and/or function objects are created without using a single coordinating computing device, or are created using multiple coordinating computing devices on the computer network.

14. An apparatus for generating a decentralized model on a computer network, the decentralized model including one or more models having computer instructions and data that describe behavior of a system and/or evaluate the system, comprising:

a means for generating data objects and/or function objects, at least some of the data objects and/or function objects being model inputs and/or model outputs, at least some of the function objects defining interdependencies within a model by providing solvable expressions that relate data objects and/or function objects;

a means for publishing identifiers for the data objects and/or the function objects;

a means for subscribing to the data objects and/or the function objects by creating relationships between the data objects and/or the function objects by referencing the data objects and/or the function objects within the function objects, thereby linking the data objects and/or the function objects, wherein networks of linked data objects and/or function objects emerge, the means for subscribing being responsive to the means for publishing and utilizing the published identifiers;

a means for sending messages to referencing data objects and/or function objects when referenced data objects and/or referenced function objects change;

a means for invoking methods on data objects and/or function objects when data objects and/or function objects require information;

a means for solving the expressions within the function objects when the messages are received;

a means for storing the data objects and/or the function objects in a central location on a single computing device or in a distributed manner across multiple computing devices on a computer network; and wherein the relationships between the data objects and/or function objects are created without using a single coordinating computing device, or are created using multiple coordinating computing devices on the computer network.

15. A computer program product comprising:

a computer usable medium for generating a decentralized model on a computer network, the decentralized model including one or more models having computer instructions and data that describe behavior of a system and/or evaluate the system;

a set of computer program instructions embodied on the computer usable medium, including instructions to:

generate data objects and/or function objects, at least some of the data objects and/or function objects being model inputs and/or model outputs, at least some of the function objects defining interdependencies within a model by providing solvable expressions that relate data objects and/or function objects;

publish identifiers for the data objects and/or the function objects;

based on the published identifiers subscribe to the data objects and/or the function objects by creating relationships between the data objects and/or the function objects by referencing the data objects and/or the function objects within the function objects, thereby linking the data objects and/or the function objects, wherein networks of linked data objects and/or function objects emerge;

send messages to referencing data objects and/or function objects when referenced data objects and/or referenced function objects change;

invoke methods on data objects and/or function objects when data objects and/or function objects require information;

solve the expressions within the function objects when the messages are received;

store the data objects and/or the function objects in a central location on a single computing device or in a distributed manner across multiple computing devices on a computer network; and wherein the relationships between the data objects and/or function objects are created without using a single coordinating computing device, or are created using multiple coordinating computing devices on the computer network.

* * * * *